BEST AVAILABLE COPY

United States Patent [19]
Goldbach et al.

[11] Patent Number: 5,050,351
[45] Date of Patent: Sep. 24, 1991

[54] VEHICLE DOOR

[75] Inventors: Hubert Goldbach, Ratingen; Boris Koch, Wermelskirchen, both of Fed. Rep. of Germany

[73] Assignee: Bayer Aktiengesellschaft, Fed. Rep. of Germany

[21] Appl. No.: 597,831

[22] Filed: Oct. 15, 1990

[30] Foreign Application Priority Data

Oct. 27, 1989 [DE] Fed. Rep. of Germany ....... 3935857

[51] Int. Cl.$^5$ .............................................. B60J 5/04
[52] U.S. Cl. ................................. 49/502; 49/DIG. 1; 296/146
[58] Field of Search ........... 49/502, 503, 501, DIG. 1; 296/146, 148

[56] References Cited

U.S. PATENT DOCUMENTS 4,651,470 3/1987 Imura et al. ......................... 49/502
4,866,883 9/1989 Brown et al. ....................... 49/502

Primary Examiner—Philip C. Kannan
Attorney, Agent, or Firm—Connolly and Hutz

[57] ABSTRACT

A vehicle door consists of a base, a cover facing the passenger compartment and an outside door leaf joined to the base and cover. Connection of the outside door leaf to the base and cover is arranged to provide easy removal and replacement of the door leaf. The door leaf has peripheral edges releasably connected to the base and cover. Moreover, at least one pair of corresponding edges in the cover and door leaf comprise grooves located in the plane of the door and opening toward one another. A joining and sealing resilient profile strip is positioned in the grooves to compensate for differences in thermal expansion.

4 Claims, 2 Drawing Sheets

VEHICLE DOOR

This invention relates to a vehicle door consisting of a base, a cover facing the passenger compartment and an outside door leaf joined to the base and the cover.

Efforts are being made nowadays to make vehicle doors at least predominantly of plastic and, in this connection, to provide an outside, readily replaceable door leaf because experience has shown that it is the door leaf which is most commonly damaged and has to be replaced. In conventional steel plate constructions, the door leaf was not detachable and the entire door had to be replaced if the door leaf could not be repaired or was too expensive to repair in terms of labor costs.

According to one of applicants' own earlier applications representing the prior art, a door of the type in question was made up of a base and a door leaf screwed thereto, the base being provided with a cover on the passenger compartment side. In a variant, the cover surrounds the base, including its periphery, so that the door leaf is directly joined to the cover.

It has been found that, where it is rigidly joined to the base or to the cover, the door leaf can undergo deformation through differential thermal expansion in relation to the base or cover. In addition, a screw connection is very expensive because reinforcements have to be provided for the screw holes in the door leaf. In the case of thermoplastic parts, this often leads to sink marks in the surface to be painted. Finally, the connection should ideally be dust-proof.

The problem to be solved by the invention was to provide a vehicle door of the type mentioned at the beginning in which the door leaf would be easy to fit and replace and the connection between the door leaf and the base or interior cover would compensate differences in thermal expansion and, in addition, would provide a seal.

This problem has been solved by a vehicle door in which the peripheral edges of the door leaf and the base or cover comprise connections releasable from one another, at least one pair of corresponding edges comprising grooves which are situated in the plane of the door and which open towards one another and a joining and sealing, resilient and elastic profile strip which compensates differences in thermal expansion engaging in the grooves.

Although German Offenlegungsschrift No. 36 08 506 discloses the arrangement of an elastomeric profile strip in a groove in the base, the strip merely represents in this application a position-fixing frictional hold for a clamping screw fitting and does not, as in the present invention, compensate differences in thermal expansion by interlocking with the base and the outside leaf.

Depending on the geometry and construction of the door, several peripheral sides may have to be provided with the new connection. In the most simple case, however, two peripheral sides of the door leaf may be provided with a hook-like profile which forms a groove and in which the projecting encircling edge of the base or the cover engages. In this case, the third edge and optionally the fourth edge of the door leaf and the base or cover is shaped in accordance with the new connection. In this way, the door leaf can be pushed onto the edges of the base or the cover, if necessary with elastic deformation, and fitting can be completed by insertion of the profile strip into the hook-like edges of the door leaf and the base or cover. Where the new connection is used on all sides, the door leaf can be fitted perpendicularly (unidirectionally) onto the base. The profile strip is of such a width that it accommodates the contraction of the door leaf during cooling. Its thickness is such that it fits in the grooves substantially free from play. The position of the door leaf is fixed by a centering element on its lower edge and by form-locking fitting elements on its upper edge. The narrow interval between the grooves ensures that the profile strip is for the most part only shear-stressed. The longitudinal expansion of the door leaf is unimpeded. The profile strip on the one hand must the stiff enough to meet this requirement, but on the other must be elastic enough to provide a seal, to avoid noise and to adapt itself to the contour of the door leaf and the base or the cover. A particularly suitable constituent material for the profile strips is a polyurethane or any other synthetic elastomer having a hardness of 60 to 80 Shore D (as measured in accordance with DIN 53 505). A hand tool consisting of a handle with a correspondingly long wire terminating in a hook may be used to draw in the profile strip. This operation may be automated by delivering the profile strip from a roll to the fitting station and drawing it into the pair of edges to be joined by the gripper of a robot.

In one particular embodiment, the profile strip is of Z-shaped cross-section and the door leaf and the base or cover are spaced correspondingly apart from one another.

By virtue of the fact that, through the Z shape, the door leaf is kept away from the edge of the base or the cover at this point, rattling noises are avoided.

In another variant, the profile strip comprises a sealing lip which projects between the edges and forms a seal against the door frame of the bodywork.

In this way, the sealing of the passenger compartment can be moved as far as possible to the outside.

In another particular embodiment, the profile strip comprises a sealing lip which sealingly overlaps the side of the edge of the door leaf. It may also be provided towards the base.

An increased sealing effect is obtained in this way.

One example of embodiment of the new vehicle door is described in detail in the following with reference to the accompanying purely diagrammatic drawings, wherein.

Anything that has no immediate connection with the new embodiment of the door, such as windows, window lift mechanism, lock, door handles, hinges and the like, has been left out.

Figure 1:
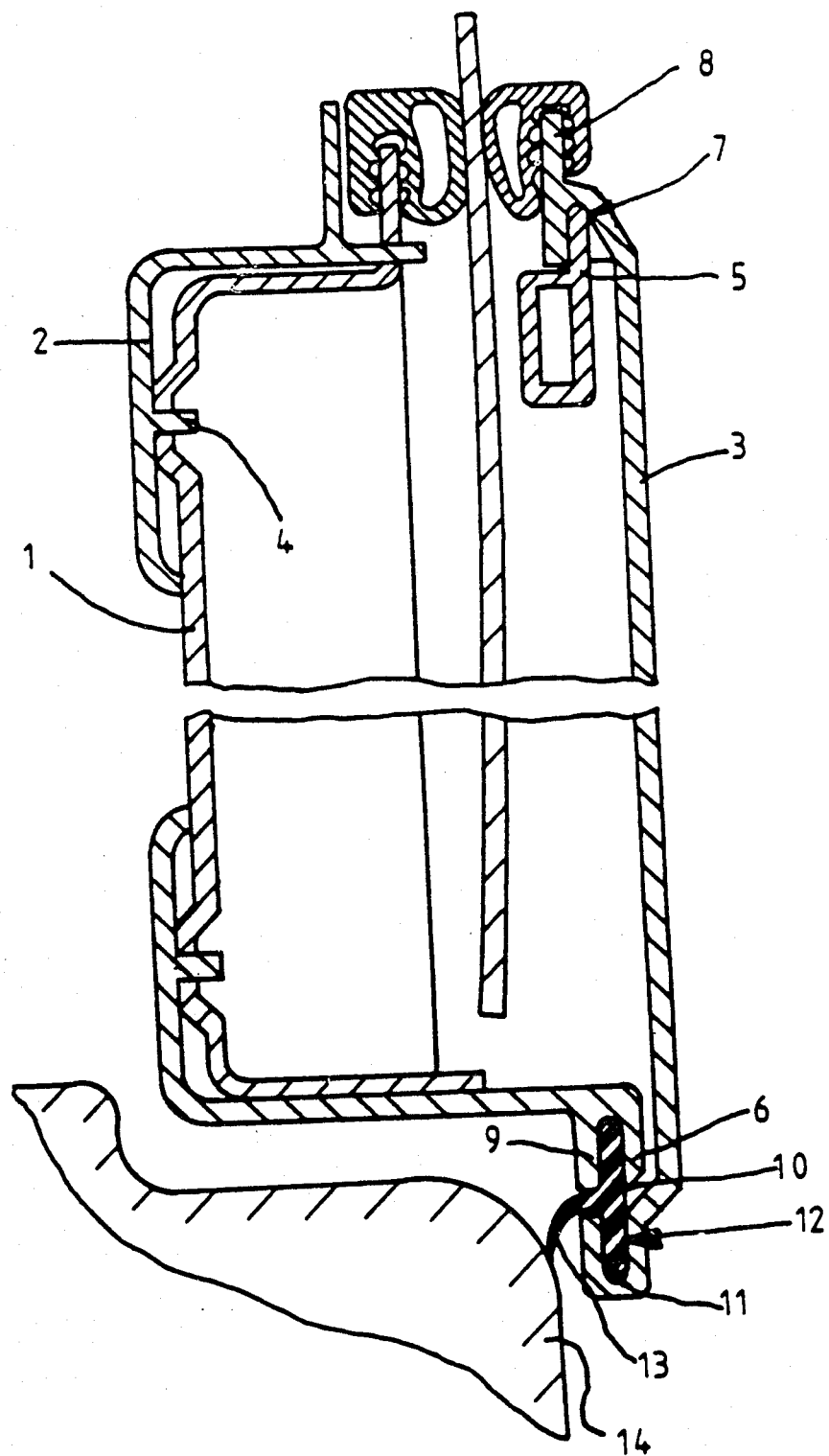
FIG. 1 is a section through the door and door frame in outline.

As shown in FIG. 1, the vehicle door consists of a base 1 with a plastic/metal structure which, facing the passenger compartment, comprises a cover 2 of plastic and, on the outside, a door leaf 3 of plastic. The cover 2 is displaceably fixed to the base 1 by press studs 4. The cover 2 and the base 1 have encircling edges 5, 6, the upper edge 5 and the front edge (not shown) being identical in shape. These edges 5 engage in grooves 7 arranged in the upper edge 8 and in the front edge (not shown) of the door leaf. The lower edge 6 and the rear edge (not shown) each comprise a groove 9 in which engages a profile strip 10 of a tough and resilient polyurethane elastomer. The lower edge 11 and the rear edge (not shown) of the door leaf 3 are provided with a groove 12 which faces towards the groove 9 and in which the second longitudinal edge of the profile strip 10 engages. The profile strip 10 fits in the grooves 11, 12 substantially free from play. By virtue of the narrow interval between the grooves 11 and 12, the profile strip 10 is substantially shear-stressed so that movement between the door leaf 3 and the cover 2 is prevented. The resilience and toughness of the profile strip 10 and its dimensions are such that differences in thermal expansion between the cover 2 and the door leaf 3 are compensated without the connection loosening or being overstressed. In addition, a moisture-proof seal is provided. A sealing lip 13 of the profile strip 10 projects inwards between the edges 6 and 11, forming a seal with respect to the bodywork which, at this point, is formed by a door sill 14.

Figure 2:
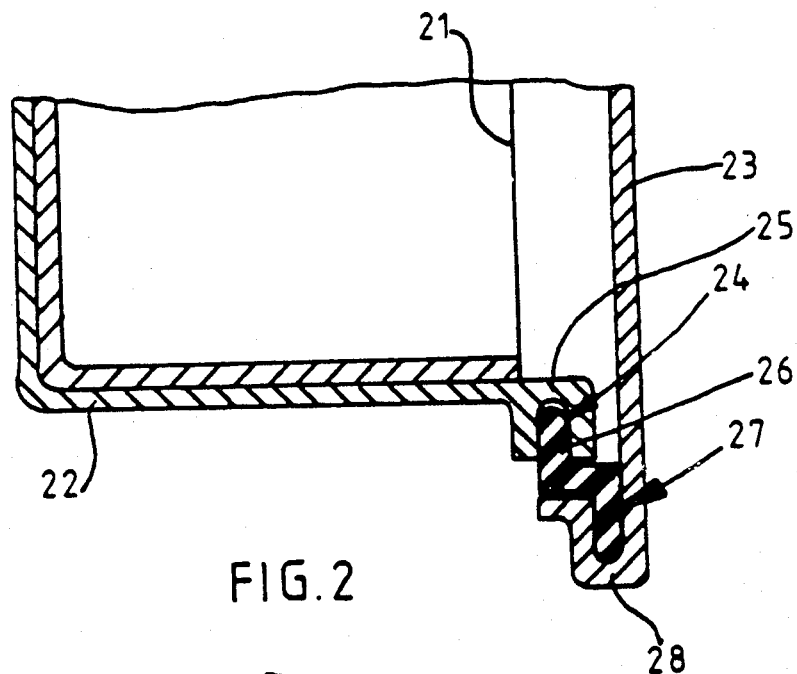
FIG. 2 is a section through a modified connection.

In FIG. 2, the inner cover 22 surrounds the base 21. The door leaf is denoted by the reference 23. The cover 22 comprises an edge 25 which forms a groove 24, a Z-shaped profile strip 26 engaging in the groove 24. Its second longitudinal edge engages in a groove 27 in the edge 28 of the door leaf 23. Through the Z-like cross-section of the profile strip 26, the door leaf is kept away from the edge 25 so that rattling noises are avoided.

Figure 3:
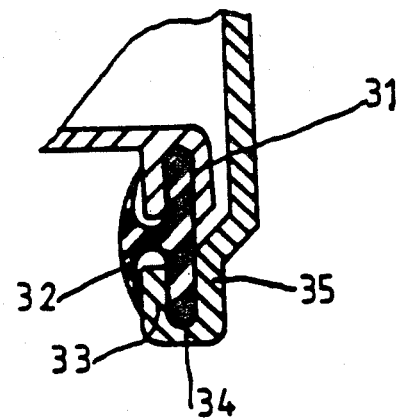
FIG. 3 is a section through another modified connection
Figure 5:
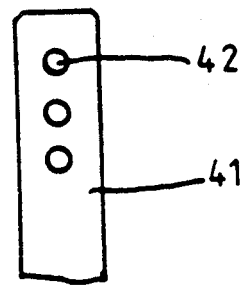
FIG. 5 is a plan view of the hook of a drawing-in tool.

In FIG. 3, the profile strip 31 is provided with a sealing lip 32 which sealingly overlaps the angled side 33 of the edge 34 of the door leaf 35.

Figure 4:
FIG. 4 is a plan view of a profile strip.

In FIG. 4, the profile strip 41 has holes 42 to receive the hook of a drawing-in tool of the type already described by way of example.

We claim:

1. A vehicle door consisting of a base, a cover facing a passenger compartment, and an outside door leaf joined to the base and cover, the door leaf having peripheral edges releasably connected to the base and cover, at least one pair of corresponding edges in the cover and door leaf comprising grooves located in the plane of the door and opening toward one another, and a joining and sealing resilient profile strip in the grooves constructed and arranged to compensate for differences in thermal expansion.

2. A vehicle door as in claim 1 wherein the profile strip has a Z-shaped cross-section, and wherein the door leaf is spaced apart from the base and cover.

3. A vehicle door as in claim 1 including a door frame, and wherein the profile strip has a sealing lip which projects between the edges of the cover and door leaf forming a seal against the door frame.

4. A vehicle door as in claim 1 wherein the profile strip has a sealing lip which sealingly overlaps a portion of the door leaf.

* * * * *